June 3, 1969 R. SAMSON 3,447,850

SEALED CABINETRY

Filed May 22, 1967

INVENTOR.
Robert Samson

BY
Mueller, Aichele & Rauner

ATTY'S.

1

3,447,850

SEALED CABINETRY

Robert Samson, Scottsdale, Ariz., assignor, by mesne assignments, to the United States of America as represented by the Administrator of the National Aeronautics and Space Administration Filed May 22, 1967, Ser. No. 640,154

Int. Cl. A47b 96/00, 88/20

U.S. Cl. 312—296 5 Claims

ABSTRACT OF THE DISCLOSURE

A cabinet sealed against electromagnetic radiation having a plurality of drawers with spring tensioned drawer fronts which float with respect to the drawer frame permitting the drawer front to seal against a deformable electromagnetic radiation sealing strip. Two adjacent drawer fronts may share a common sealing strip without leakage.

The invention described herein was made in the performance of work under a NASA contract and is subject to the provisions of Sec. 305 of the National Aeronautics and Space Act of 1958, Public Law 85-568 (72 Stat. 435; 42 U.S.C. 2457).

*Background of the invention*

This invention relates to cabinetry preferably useable with electronic equipment which seals out electromagnetic interfering radiation.

In the fabrication of electronic equipment, it is desired that electromagnetic radiation found in the environment in which the equipment is used not interfere with the circuitry within the cabinet. Such interference may cause malfunctions. Contrarywise, many circuits inside electronic equipment generate electromagnetic radiation and such radiation, under certain governmental regulations, must be sealed such that it does not interfere with other electronic equipment located adjacent the cabinet.

Much money and effort have been spent on sealing cabinets against the passage of electromagnetic radiation. One of the problems in cabinets housing relatively large drawers of electronic equipment which must be made removable is the completeness of the radiation seal wherein the drawer-front panel engages the front panel of the cabinet. To date such drawer panels have been made rigid with respect to the frame to enable the drawer of electronic equipment to be easily carried when taken out of the cabinet. As such, some electromagnetic radiation is inadvertently permitted to pass into or out of the electronic cabinet. It is desired that the electromagnetic radiation shielding be as secure as possible.

*Summary of the invention*

It is an object of this invention to provide apparatus which seals against passage of electromagnetic radiation.

It is another object of this invention to provide a drawer construction in which the frame and the front panel of the drawer are floating with respect to each other yet permit the front panel to support the drawer.

It is another object of this invention in connection with the immediately preceding object to provide a cabinet assembly having a plurality of drawers each with a separate floating drawer front panel which share a common radiation shielding strip and which provide good shielding against electromagnetic radiation.

Apparatus incorporating the teachings of the present invention includes a drawer type of electronic equipment in which a front panel is attached to the drawer frame under spring tension. Such spring tension is applied between the frame and the front panel at spaced apart peripheral locations. The front panel, being free to move with respect to the drawer, adjusts to any misalignments between the supporting frame and the drawer. By such adjustments, the drawer panel always is flat against the frame. As such, a constant sealing pressure is provided around the drawer panel periphery. Adjacent drawers may space a single sealing strip when both use this invention.

2

*The drawing*

*Description of the illustrative embodiment*

Figure 1:
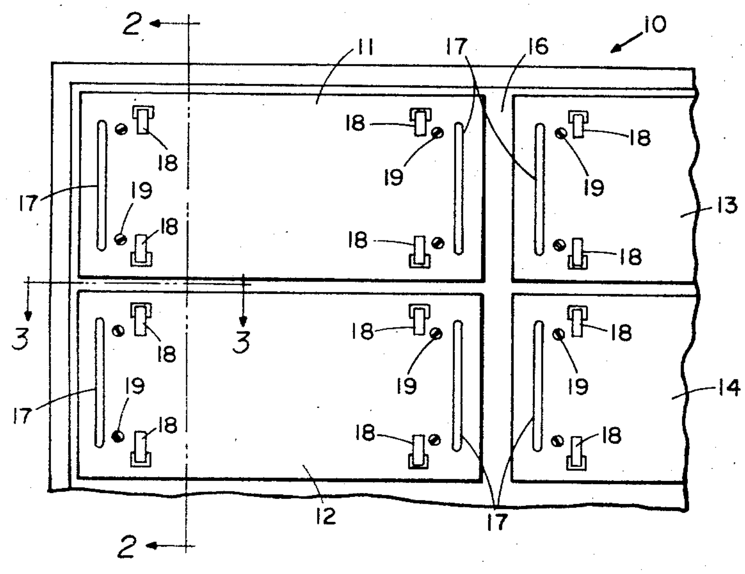
FIG. 1 is a partial front elevation view of equipment utilizing the present invention.

Like numbers denote like parts and structural features in the various views. A cabinet assembly 10 has a plurality of removable drawers 11, 12, 13, and 14. The drawer front or cover panels engage cabinet frame front panels 15 at the deformable radiation sealing strip 16 (of known construction). Note that front or cover panels of adjacent drawers 11 and 12 share strip 16, as will be later referred to.

Each drawer has a pair of handles 17 with which each drawer may be carried. Four drawer clamp assemblies 18 are provided to securely and evenly clamp the drawer panels to front panel 15. The spring tension mounts 19 enable good radiation in sealing pressure and are of sufficient strength to permit the entire drawer with mounted equipment (not shown) to be carried by handle 17.

Figure 2:
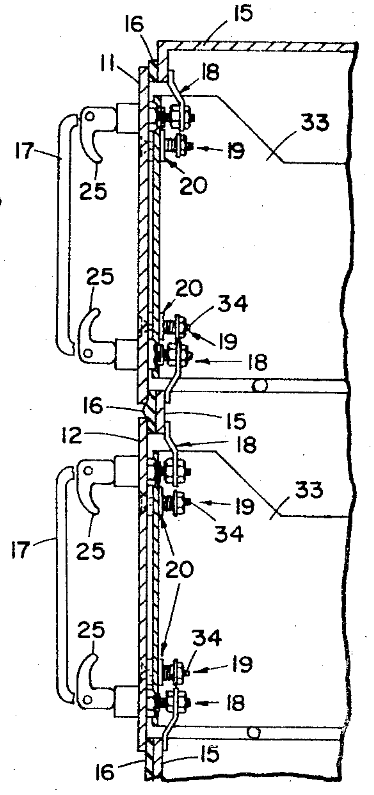
FIG. 2 is a partial sectional view taken in the direction of the arrows along line 2—2 in FIG. 2.

The drawer clamp assemblies 18 each include a handle 25 pivoted about pin 26 and have a portion adjacent boss 27 which acts as a locking clamp, as is known in the art. Handle 25 also includes pin 28 which extends through boss 27 on either side of the drawer front panel to rotatable latch 29. Latch 29 extends radially outward of pin 28 and engages the front panel 15 as best seen in FIG. 2. When it is desired to loosen the clamp, handle 25 is pulled outwardly and then rotated from moving latch 29 out of engagement with front panel 15, thereby freeing the drawer for movement.

Figure 3:
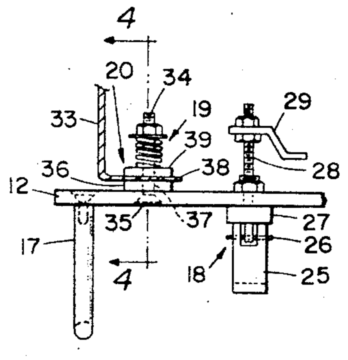
FIG. 3 is a partial sectional view taken in the direction of the arrows along line 3—3 in FIG. 2 and shows a relationship of the drawer panel, spring tension mount, and drawer frame.
Figure 4:
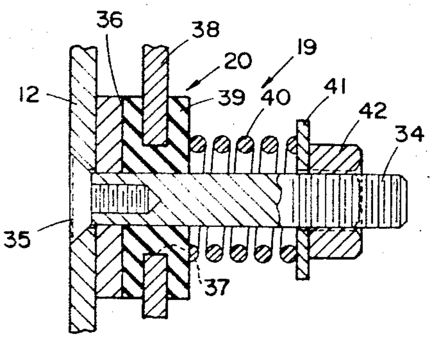
FIG. 4 is a sectional view taken along line 4—4 in FIG. 3 and showing details of the spring tension mount.

The spring tension mount 19 enabling the drawer front panels to evenly and securely engage deformable sealing strip 16 will now be described. Each drawer has a frame 33 on which the spring mount 19 is secured as at peripherally spaced-apart locations 20. Mount 19 includes pin 34 having locking screw 35 threadingly engaged for securing the pin to a front panel, such as panels 11 and 12 (FIGS. 3 and 4). Radially outwardly extending flange 36 formed on pin 34 engages the back side of the drawer front panel. (See FIG. 4.) Frame 33 is provided with a pair of flanges 38 (FIGS. 2 and 3) respectively inwardly extending and in which location 20 is formed. Location 20 includes aperture 37 formed within flange 38 which receives Teflon washer 39 which slideably supports pin 34. A strong spring 40 is disposed between the inner edge of Teflon washer 39 and stop washer 41 securely held by stop nut 42 on pin 34. Spring 40 is under compression yieldably strongly urging front drawer panel 11 toward flange 38 of frame 33. Stop nut 42 being threaded, is adjustable for altering the tension.

As shown in the illustrative embodiment, there are four spring-urged tension mounts per drawer, each one in juxtaposition of a drawer corner for evenly distributing the weight of the electronic apparatus (not shown) to the drawer front panel and also for providing an evenly distributed peripheral urging force on drawer panel 11.

The mounts 19 in combination with the clamps 18 provide a floating drawer panel 11 which when clamped toward cabinet panel 15 securely engages sealing strip 16. As best seen in FIG. 1, two adjacent drawer panels 11 and 12, for example, are both compressing sealing strip 16. With the arrangement of this invention, both panels are compressing strip 16 and with the floating drawer panel the compression on strip 16 by each panel is independent of the other. This arrangement prevents one drawer from compressing strip 16 more than another such that no electromagnetic radiation leaks are formed between a drawer front panel and a sealing strip because that sealing strip has been unduly compressed by an adjacent drawer front panel.

With reference to FIG. 2, frames 33 of the drawers may be rollingly mounted on the frame bar 45 of the cabinet 10 as by ball bearing slides schematically indicated by the circle 46. Such slides are well known in the art and will not be further described as they are not pertinent to the present invention.

I claim:

1. For sealed cabinetry, a self-adjusting pressure sealing apparatus adapted to be removably attached over an opening in a cabinet wall wherein a cover panel peripheral edge portion is adapted to engage a cabinet panel with a deformable sealing strip on one of the panels for forming a tight seal therebetween, a first plurality of clamp means on one of the panels for releasably engaging the other panel and pressing the panels together, frame means adjacent the cover panel with a second plurality of support locations means spaced apart on said frame means adjacent and facing the peripheral edge portions of the cover panel, the improvement including in combination, a second plurality of yieldable spring mounting means on said cover panel disposed in operative engagement with said location means, respectively, and yieldably strongly urging said cover panel toward said frame means, said mounting means including an inwardly extending pin member movably extending through said location means for providing relative movements between the cover panel and the frame means.

2. The apparatus of claim 1 wherein said first and second pluralities are the same and each clamp means is located adjacent a spring mounting means.

3. The apparatus of claim 1 wherein every spring mount means is located immediately adjacent one of the clamp means, respectively.

4. The apparatus of claim 1 further including a plurality of cover panels respectively covering a like plurality of openings in the front panel, unitary portions of the sealing strip extending between adjacent openings such that respective adjacent cover panels' peripheral edge portions engage said sealing strip unitary portion.

5. The apparatus of claim 1 wherein each said spring mount means further includes, stop means on an inward end portion of each member, a spring disposed between each location means and said stop means, respectively, and yieldably urging the frame and the cover panel, together with sufficient urging such that the frame and any apparatus on the frame are supportable by said cover panel but permit said cover panel to move with respect to the frame as the clamp means are actuated whereby the two panels are everywhere along the peripheral edge portions evenly compressing the deformable sealing strip for forming a continuous seal along the cover panel periphery.

References Cited

UNITED STATES PATENTS

| | | | |
|---|---|---|---|
| 2,571,568 | 10/1951 | Greenup | 312—215 X |
| 3,189,938 | 6/1965 | Saunders | 312—220 |

FOREIGN PATENTS

| | | |
|---|---|---|
| 1,354,308 | 1/1964 | France. |

JAMES T. McCALL, *Primary Examiner.*

U.S. Cl. X.R.

312—319, 320